INTEGRATED CIRCUIT ELECTRONIC ANALOG DIVIDER WITH FIELD EFFECT TRANSISTOR THEREIN
Filed Oct. 3, 1968

INVENTOR
ARNOLDS JANSONS

BY H. H. Losche
ATTORNEY

United States Patent Office 3,538,320

Patented Nov. 3, 1970

3,538,320

INTEGRATED CIRCUIT ELECTRONIC ANALOG DIVIDER WITH FIELD EFFECT TRANSISTOR THEREIN

Arnolds Jansons, Indianapolis, Ind., assignor to the United States of America as represented by the Secretary of the Navy Filed Oct. 3, 1968, Ser. No. 764,806
Int. Cl. G06g *7/16*
U.S. Cl. 235—196 3 Claims

ABSTRACT OF THE DISCLOSURE

An electronic analog divider circuit having an operational amplifier with an output filtering capacitor and a fedback with a field effect transistor therein to produce a voltage representative of a quotient on the output of the operational amplifier from a variable voltage representative of a dividend applied as an input to the operational amplifier and the duty ratio of a variable divisor voltage applied to the gate terminal of the field effect transistor. A field effect transistor can be used also in the input to the operational amplifier to produce multiplification of the variable input voltage and this product then divided by the divisor duty ratio variable voltage to produce a quotient voltage.

BACKGROUND OF THE INVENTION

This invention relates to electronic analog divider and multiplier circuits and more particularly to a divider and multiplier circuit using an operational amplifier circuit with integrated circuits which combine the division or multplication and filtering operations in one component.

Previously the division in analog systems was accomplished by use of feedback servomechanisms or time division multipliers suitably connected. However, the servomechanism dividers were limited to low frequency applications only and the time division multipliers used special smoothing filters and did not use modern integrated circuit components to enhance the reliability and reduce size.

SUMMARY OF THE INVENTION

In this invention an operational amplifier integrated circuit has a filtering capacitor coupled to the output and a field effect transistor in a feedpack circuit. One input to the operational amplifier is adapted to receive a variable voltage representative of the dividend and an input to the gate terminal of the field effect transistor is adaptable to receive a variable voltage representative of the divisor. The output of the operational amplifier will then provide the quotient. If a field effect transistor is also placed in the input to the operational amplifier and a multiplying voltage applied to the gate terminal thereof, the product therefrom constitutes the dividend for the divider circuit. The divisor is gated voltage having a variable pulse width applied through a switch with a duty ratio proportional to the pulse width. The divider circuit is useful in dividing the slant range voltage of a radar system by the target range voltage to obtain an analog voltage representative of the radar antenna depression angle as the quotient. It is therefore a general object of this invention to provide an electronic analog divider integrated circuit having an operational amplifier which combines the division and filtering operation in one component and in which the dividend can be a product of two input voltages.

BRIEF DESCRIPTION OF THE DRAWING

These and other objects and the attendant advantages, features, and uses will become more apparent to those skilled in the art as a more detailed description proceeds when taken along with the accompanying drawing, in which.

DESCRIPTION OF THE PREFERRED EMBODIMENT

Figure 1:
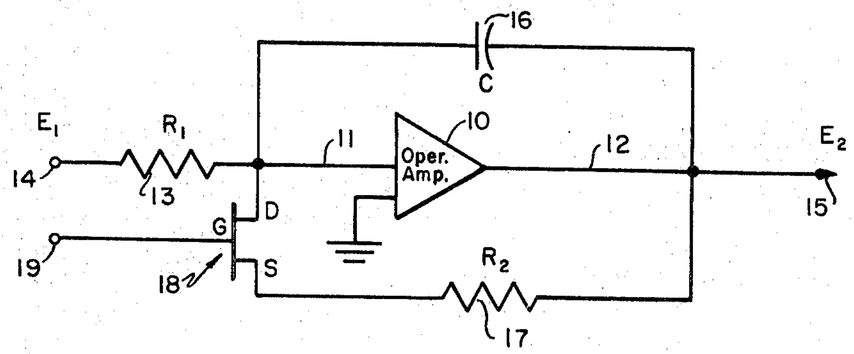
FIG. 1 is a partial schematic and partial blocked diagram of the preferred embodiment of the invention.

Referring more particularly to FIG. 1, there is shown used an operational amplifier 10 having an input conductor 11 thereto and an output conductor 12 therefrom. The input conductor 11 is coupled through a summing resistor 13 from an input terminal 14 for connection to circuits with voltages representative of the dividend for the divider circuit. The output 12 is coupled to an output terminal 15 on which will be represented the quotient in analog voltage. The output 12 has a feedback circuit to the input 11 through a large filtering capacitor 16 and the output 12 is also coupled in a feedback through a summing resistor 17 to the source terminal of a field effect transistor 18 (normally referred to as an FET), the drain terminal of which is coupled to the input conductor 11. The capacitor 16 filters the output voltages of undersirable signals. The gating terminal of the FET 18 is coupled to an input terminal 19 to which is adapted to be applied a duty ratio voltage signal representative of the divisor for the divider circuit diagrammatically shown in this figure. Any input dividend voltage applied to terminal 14 and divided by the divisor voltage on the terminal 19 in accordance with the duty ratio thereof will produce analog voltage on the output 15 representative of the quotient.

Figure 2:
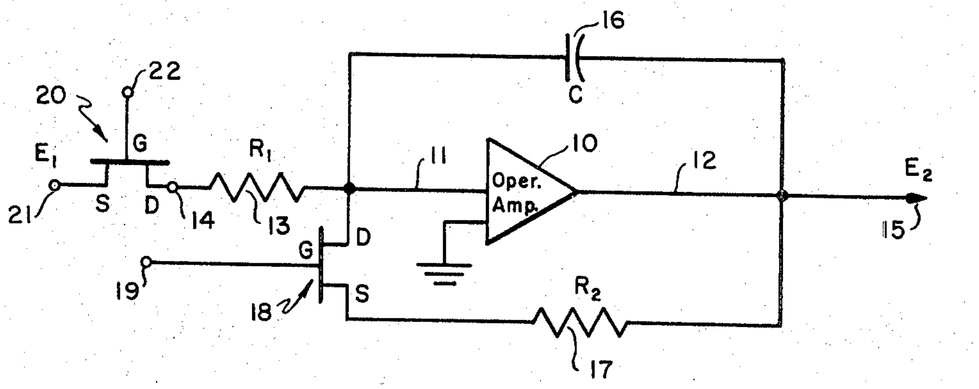
FIG. 2 is a modification of FIG. 1 showing an additional field effect transistor used as a multiplier.

Referring more particularly to FIG. 2, where like reference characters are applied to like parts as shown in FIG. 1, the input terminal 14 for the dividend analog voltage may have the drain terminal of a FET 20 coupled thereto with a terminal 21 coupled to the source terminal of the FET 20. The gating terminal 22 of the FET 20 may have a voltage applied thereto for producing multiplication of the voltage applied to terminal 21 to produce a product on the terminal 14 which constitutes a dividend voltage for the divider circuit.

Figure 3:
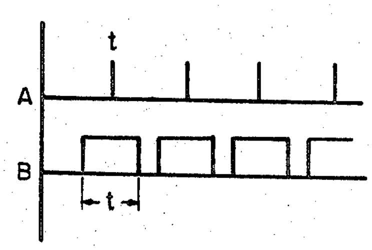
FIG. 3 illustrates waveforms of the duty ratio of the divisor voltages.

The duty ratio divisor voltage may vary in width as shown in FIG. 3 from the voltage spike as shown in line A of FIG. 3 to the voltage width as shown in line B of FIG. 3. The duty ratio of this voltage applied to terminal 19 of FIGS. 1 and 2 may vary as represented by the time $t/T$ where $t$ is the "on" time and T is the full time period per cycle of the varying voltage applied to terminal 19. This varying voltage results from a circuit not shown herein which produces a sawtooth voltage with the variable bias to produce a voltage in time $t$ to the total period of the sawtooth cycle voltage of time T. Such a duty ratio voltage is more fully shown and described in the text IRE Transactions on Electronic Computers for March 1958, vol. EC–7, No. 1, beginning on p. 41 of an article by Hermann Schmid entitled "A Transistorized Four-Quadrant Time Division Multiplier With an Accuracy of .1 Percent." This $t/T$ duty ratio voltage may represent the target range voltage of a radar system which is used as the divisor to divide the slant range voltage applied to terminal 14 of FIGS. 1 and 2.

OPERATION

In the operation of this divider circuit let it be assumed that the slant range voltage is represented in FIGS. 1 and 2 as $E_1$ and the output voltage at the output terminal 15 is represented as $E_2$. The duty cycle divisor voltage applied to terminal 19 is considered as $t/T$. In steady state the voltage across the capacitor 16 will not change and therefore the sum of all currents in the input conductor 11 of the operational amplifier 10 will be zero. This is expressed by Formula 1 where the left side $E_1/R_1$ is the input current to the input conductor 11 of the operational amplifier 10 and the right side $$\left[\frac{E_2}{R_2}\right]\left[\frac{T}{t}\right]$$

represents the average output current from this conductor. The polarity of the output signal is opposite to the polarity of $E_1$. With the summing resistors $R_1$ and $R_2$ shown in FIGS. 1 and 2 the equations may be set up as $$\frac{E_1}{R_1}=\left[\frac{E_2}{R_2}\right]\left[\frac{t}{T}\right] \quad (1)$$

$$\frac{E_2}{R^2}=\frac{\frac{E_1}{R_1}}{\frac{t}{T}} \quad (2)$$

This equation may be reduced to $$E_2=R_2\left[\frac{E_1T}{R_1t}\right] \quad (3)$$

Accordingly any varying voltage $E_1$ representative of the slant range applied to terminal 14 will be divided by the divisor voltage $t/T$ applied to terminal 19 to produce the quotient voltage $E_2$ on the output 15 in accordance with the variable duty ratio of $t/T$. While the values given to the various elements are matters of good technical choice, the following values may be used for one satisfactory operable divider circuit:

$R_1$=10K ohms
$R_2$=20K ohms
$C$=5 $\mu$f.
$E_1\sim$0–5 volts

If it is desirable to first multiply the slant range voltage by any voltage, the slant range voltage $E_1$ will be applied to terminal 21 in FIG. 2 and the multiplying voltage applied to terminal 22 to produce a product voltage on terminal 14 which constitutes the dividend voltage for the divisor circuit. As in FIG. 1, the quotient voltage will appear at terminal 15 of FIG. 2.

While many modifications and changes may be made in the constructional details and features of this invention to produce a quotient from two varying input dividend and divisor voltages to produce the same results and functions as set forth herein, it is to be understood that I desire to be limited in the spirit of my invention only by the scope of the appended claims.

I claim:

1. An electronic analog divider integrated circuit comprising:
- an operational amplifier having an input and an output;
- a first feedback circuit between said input and output having a filtering capacitor therein;
- a second feedback circuit between said input and output in parallel to said first feedback circuit;
- first impedance means in said input to said operational amplifier; and
- a second summing resistor and a field effect transistor coupled in said second feedback circuit with the source and drain terminals thereof coupled serially with said second summing resistor, said field effect transistor having a gate terminal input adapted to receive switching signals of variable duty ratio as a divisor to divide a variable voltage on the input as a dividend to produce an analog voltage on the output representative of the quotient.

2. An electronic analog divider integrated circuit as set forth in claim 1 wherein
- said first impedance means includes a first summing resistor and said second summing resistor in said second feedback circuit is coupled between said operational amplifier output and said field effect transistor.

3. An electronic analog divider integrated circuit as set forth in claim 2 wherein
- said first impedance means also includes a multiplying field effect transistor prior to said first summing resistor with the source and drain terminals being serially in said input and with the gate terminal thereof adapted to receive a gating input voltage for multiplying said variable input voltage to produce a quotient from the division of said multiplied input variable and gating voltages.

References Cited

UNITED STATES PATENTS

| | | | |
|---|---|---|---|
| 3,187,267 | 6/1965 | Merington | 330—103 X |
| 3,215,824 | 11/1965 | Alexander et al. | 235—196 X |
| 3,373,959 | 3/1968 | Petersen | 235—194 X |
| 3,374,362 | 3/1968 | Miller | 307—251 X |
| 3,378,779 | 4/1968 | Priddy | 307—251 X |

MALCOLM A. MORRISON, Primary Examiner

J. F. RUGGIERO, Assistant Examiner

U.S. Cl. X.R.

307—279